(12) United States Patent
Ward et al.

(10) Patent No.: US 10,478,945 B2
(45) Date of Patent: Nov. 19, 2019

(54) ABRASIVE RECOVERY ASSEMBLY FOR A WATERJET CUTTING SYSTEM

(71) Applicant: Zuluboy, Inc., Tallmadge, OH (US)

(72) Inventors: Richard Ralph Ward, Estero, FL (US); Benjamin J. Adams, Cuyahoga Falls, OH (US)

(73) Assignee: HMCC ACQUIRECO2, LLC, Burlington, Ontario (CA)

(*) Notice: Subject to any disclaimer, the term of this patent is extended or adjusted under 35 U.S.C. 154(b) by 54 days.

(21) Appl. No.: 15/622,746

(22) Filed: Jun. 14, 2017

(65) Prior Publication Data
US 2018/0361538 A1 Dec. 20, 2018

(51) Int. Cl.
| | |
|---|---|
| *B24C 9/00* | (2006.01) |
| *B24C 1/04* | (2006.01) |
| *B24C 5/04* | (2006.01) |
| *B24C 7/00* | (2006.01) |

(52) U.S. Cl.
CPC .............. *B24C 9/006* (2013.01); *B24C 1/045* (2013.01); *B24C 5/04* (2013.01); *B24C 7/0007* (2013.01); *B24C 9/003* (2013.01)

(58) Field of Classification Search
CPC .......... B24C 9/006; B24C 1/045; B24C 5/02; B24C 5/04; B24B 57/00
USPC ...................................... 451/87, 88
See application file for complete search history.

(56) References Cited

U.S. PATENT DOCUMENTS

| | | | |
|---|---|---|---|
| 4,382,170 A | 5/1983 | Klingel | |
| 5,056,718 A | 10/1991 | Wakefield | |
| 5,120,930 A | 1/1992 | Sanders et al. | |
| 5,586,927 A * | 12/1996 | Herbert | B01F 11/0068 210/512.1 |
| 7,147,545 B2 * | 12/2006 | Gadd | B24B 57/00 451/38 |
| 8,176,819 B2 | 5/2012 | Rydh | |
| 9,272,347 B2 | 3/2016 | Hashish et al. | |
| 2004/0053561 A1 * | 3/2004 | Pieper | B24C 1/04 451/38 |
| 2004/0226624 A1 * | 11/2004 | Mori | B32B 1/08 138/126 |

(Continued)

FOREIGN PATENT DOCUMENTS

| | | |
|---|---|---|
| CN | 205835058 U | 12/2016 |
| DE | 4313347 A1 | 4/1993 |

(Continued)

OTHER PUBLICATIONS

Technical Possibilities of Noise Reduction in Material Cutting by Abrasive Water-jet, Agata Radvanska, et al., Strojarstvo 51, pp. 347-354 (2009).

(Continued)

*Primary Examiner* — Monica S Carter
*Assistant Examiner* — Lauren M Beronja
(74) *Attorney, Agent, or Firm* — BakerHostetler (57) ABSTRACT

An abrasive recovery system for a waterjet cutter, the abrasive recovery system comprising: a drain coupler including at least one drain nozzle, the drain nozzle having at least one wall defining a drain nozzle bore, the drain coupler defining a drain opening wherein the drain opening is in fluid communication with the drain nozzle bore; and a flexible hose coupled to the drain nozzle to establish fluid communication between the drain opening and the flexible hose.

18 Claims, 8 Drawing Sheets

(56) References Cited

U.S. PATENT DOCUMENTS

| 2005/0126472 A1* | 6/2005 | Popescu | B24C 1/045 |
| | | | 117/200 |
| 2005/0202764 A1* | 9/2005 | Tateiwa | B24C 7/0007 |
| | | | 451/87 |
| 2015/0196989 A1 | 7/2015 | Hashish et al. | |

FOREIGN PATENT DOCUMENTS

| JP | H04105900 A | | 4/1992 |
| JP | H04372399 A | | 12/1992 |
| JP | H0578472 U | | 10/1993 |
| JP | H0724736 A | | 1/1995 |
| JP | H07328857 A | | 12/1995 |
| JP | 2003268939 A | * | 9/2003 |
| JP | 2008023502 A | | 2/2008 |
| JP | 2009233784 A | | 10/2009 |

OTHER PUBLICATIONS

Plasma Cutting—The History of Plasma Cutting, AZO Materials, sponsored by Hypertherm, Inc., Nov. 21, 2001.
Noise from High Pressure Water Jetting, Health & Safety Laboratory, Rebecca Hutt, HSL 2004/15.
Waterjet Cutting Systems, Innovation Through Passion, wwwtechniwaterjet.com.

* cited by examiner

ABRASIVE RECOVERY ASSEMBLY FOR A WATERJET CUTTING SYSTEM

BACKGROUND OF THE DISCLOSURE

1. Field of the Disclosure

This disclosure is directed to a waterjet cutting system. This disclosure is further directed to an abrasive recovery assembly in a waterjet cutting system. Most particularly, the disclosure is directed to an abrasive recovery assembly that includes a drain coupler defining a drain opening in communication with a drain nozzle, and a flexible tube that connects to the drain nozzle.

SUMMARY OF THE DISCLOSURE

According to an example of the invention, an abrasive recovery system for a waterjet cutter comprises a drain coupler including at least one drain nozzle, the drain nozzle having at least one wall defining a drain nozzle bore, the drain coupler defining a drain opening wherein the drain opening is in fluid communication with the drain nozzle bore; and a flexible hose coupled to the drain nozzle to establish fluid communication between the drain opening and the flexible hose.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

The disclosure is related to a waterjet cutting system, which may be referred to as a waterjet system for brevity sake throughout this specification. The term waterjet is also not limiting in terms of the liquid used in the cutting process. Water is the most common liquid but other liquids may be used depending on the cutting application.

Figure 1:
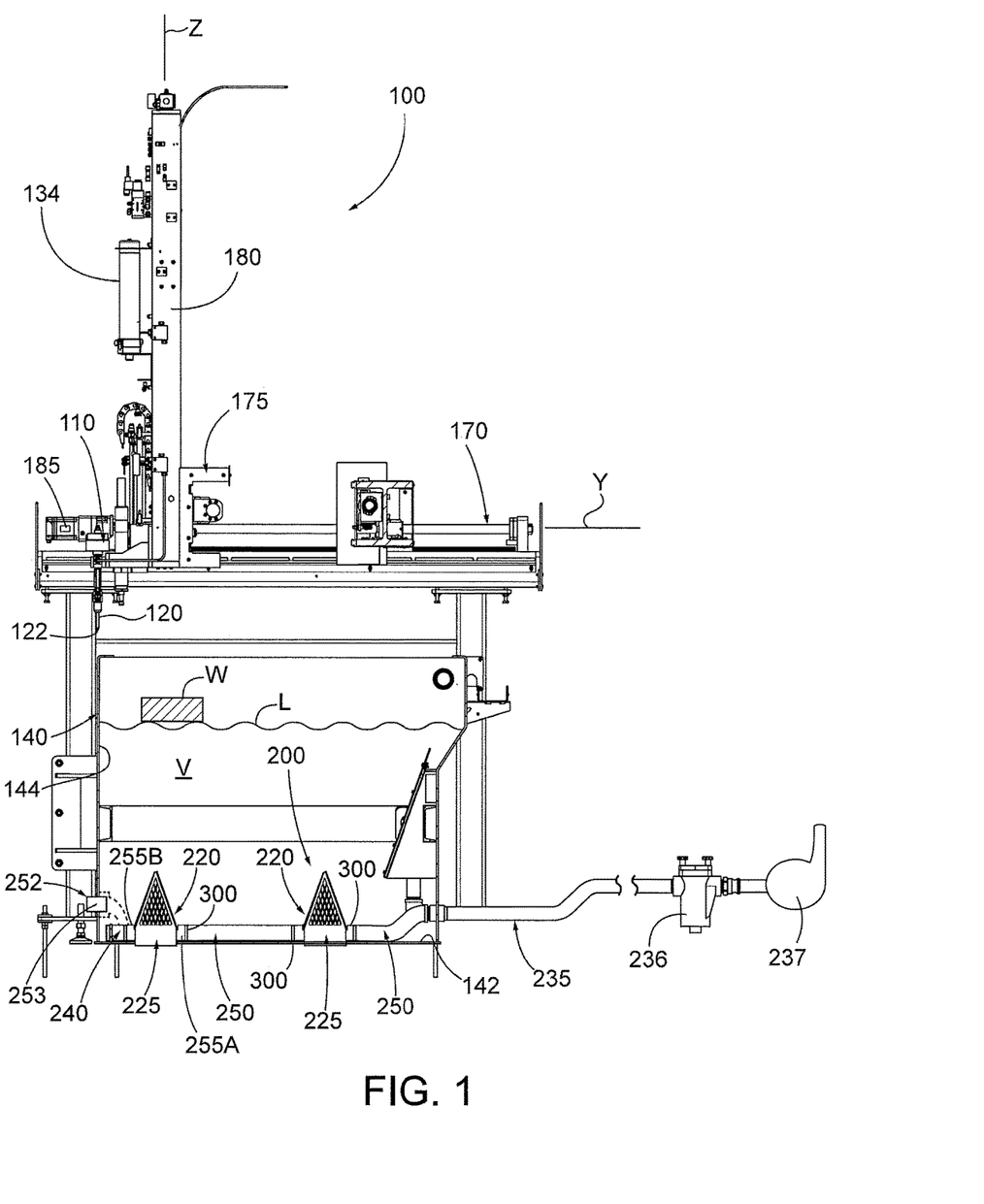
FIG. 1 is a side view of a waterjet cutting system, partially sectioned to show an abrasive recovery system according to an example.

With reference to FIG. 1, a waterjet system according to the invention is generally indicated by the number 100. Waterjet system generally includes cutting head 110 that supports a waterjet cutting tool, such as a nozzle 120. In general, the nozzle 120 delivers a high pressure stream of liquid to perform a cutting operation. Nozzle 120 includes a tip 122 at its outermost extremity. As shown, tip 122 may defining an outlet aligned with the axis of the nozzle 120 to direct the stream along the axis of the nozzle 120.

The stream may include water or other liquid. The waterjet nozzle may supply liquid only or an abrasive may be added to the liquid. Both liquid only and liquid plus abrasive processes may be used in the waterjet system 100 according to the invention. The figures depict a waterjet system 100 that includes an abrasive A. In the example, an abrasive supply line 125 connects to nozzle 120 to feed abrasive A into the stream of high pressure liquid pumped through nozzle 120. A fitting 126 may extend radially outward from nozzle 120 a distance D above tip 122 to receive abrasive line 125.

A valve 128 may be located upstream from nozzle within abrasive line 125 to selectively control the amount of abrasive supplied to nozzle 120. It will be understood that to convert to a liquid only system, the abrasive feed 125 may be turned off at valve 128 in the depicted example, or the abrasive delivery components may be omitted from the system to form a liquid only system.

In general, a waterjet cutting system 100 produces a high pressure stream using a high pressure pump, such as a direct drive pump including a crankshaft pump or intensifier pump including a hydraulic pump. The high pressure water is fed to nozzle 120 through jet supply line 135 to produce a cutting stream, which may also be referred to as a beam. For applications using an abrasive, abrasive A is also supplied to the nozzle 120 to entrain the abrasive A within the stream before it exits the nozzle 120 such that it too is forced from the nozzle 120 at high pressure. Abrasives may be any solid or semi-solid material. The selection of material often depends on the material being cut and other considerations. In some applications, ice particles are used and offer the advantage of reducing the waste material in the process since the ice melts during the cutting process. In other examples, garnet is used as an abrasive.

Abrasive A may be supplied from an abrasive source such as a hopper or other storage container. In the example shown, hopper is located remotely from the cutting assembly with supply line 125 extending from hopper 132 to a fitting 126 extending from nozzle 120. To help control delivery of abrasive, an abrasive canister 134 may be provided upstream of nozzle 120 and downstream from hopper 132. Canister 134 may be located near to nozzle 120, for example, on the same support used to support nozzle 120, as described more completely below. Canister 134 may be selectively filled from the hopper 132 and then abrasive from canister 134 may be metered out by adjustment of valve 128, which in the example shown, is located downstream of canister 134.

System 100 further includes a cutting tank, generally indicated by the number 140. Cutting tank 140 may be any container suitable for holding liquid, and generally includes a floor 142 and at least one upstanding wall 144 that define a chamber or cutting volume V that receives the liquid L. Liquid L may be any suitable liquid for use during the cutting process. In the example shown, liquid L is water. As shown, cutting tank 140 may be open at its upward extremity 145 and nozzle 120 supported above cutting tank 140. To perform submerged cutting, nozzle 120 may be lowered into the liquid L within cutting tank 140 or cutting tank 140 may be raised so that the upper surface of liquid is above tip 122.

Cutting tank 140 may be sized to receive a workpiece W. Workpiece W is any material that needs to be cut or shaped by a cutting operation. Workpiece W may have any shape or major dimension and cutting tank 140 may be sized to accommodate workpiece W, or cutting tank 140 may be of a general size to receive multiple workpieces of varying size and shape.

Workpiece W may simply rest above cutting tank 140 or it may be suspended within cutting tank 140 on a workpiece support, generally indicated by the number 150. Workpiece support 150 may be a stand, clamp, bracket, or other fixture that holds workpiece W in a selected position. Workpiece support 150 may further include a conveyor or other mechanism that transports the workpiece into and from cutting tank 140 as well. Workpiece support 150 may be supported on an external support i.e. one located outside of tank 140 or an internal support within tank 140. For example, workpiece support 140 may include a stand that is placed on the floor of cutting tank or be a bracket that extends from a wall of cutting tank 140. To that end, workpiece support 150 may be removed from the tank 140 or be fixed to or formed integrally with cutting tank 140 as desired. It will be understood that other configurations may be used to produce other types of motion for workpiece W including movement along x, y, and z axes or rotation about such axes or another axis defined by workpiece support 150.

When cutting, the workpiece W moves relative to the nozzle 120. A motion assembly generally indicated by the number 170 creates this relative motion by moving workpiece W, nozzle 120 or a combination thereof. In the example shown, motion assembly 170 provides three axis motion (x, y, and z) by moving nozzle 120. It will be understood that fewer or greater degrees of freedom may be provided depending on the application. In the example shown, motion assembly 170 includes a gantry 175 that supports a carriage 180 that supports nozzle 120. In the example shown, gantry 175 defines the x axis and carriage 180 is movable along gantry to move nozzle 120 along the x axis.

Figure 4:
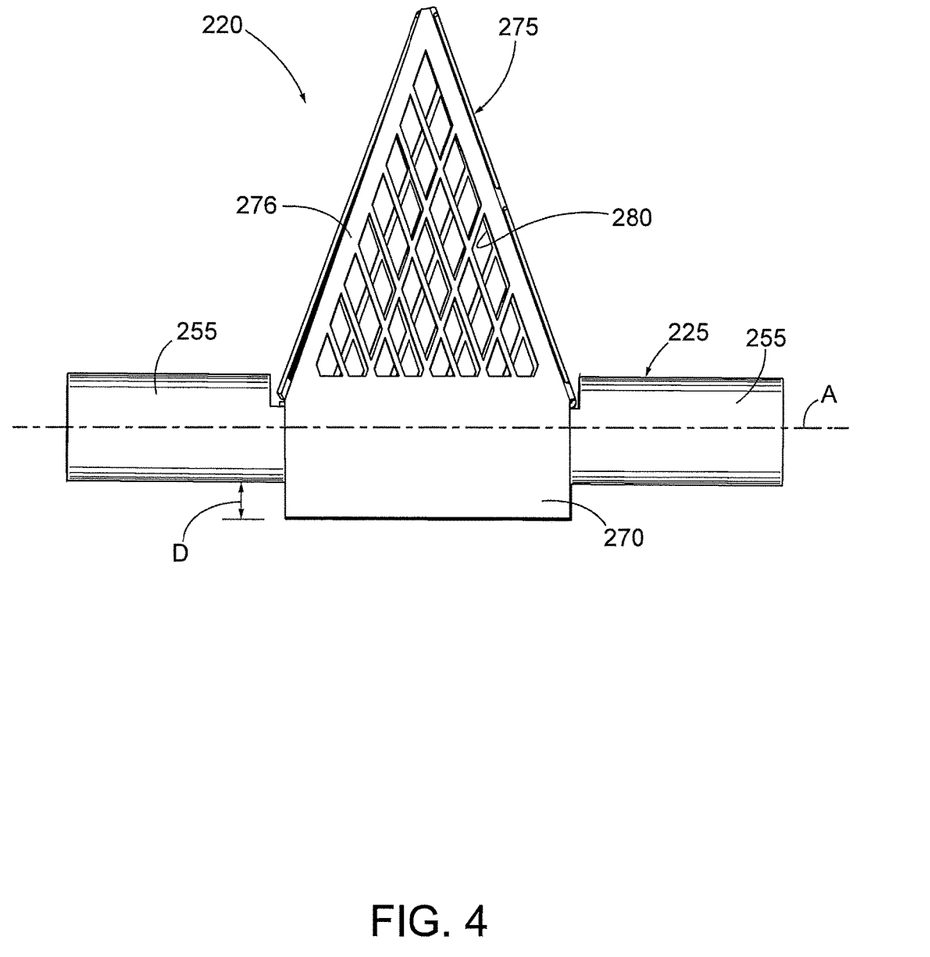
FIG. 4 is a side view thereof.
Figure 5:
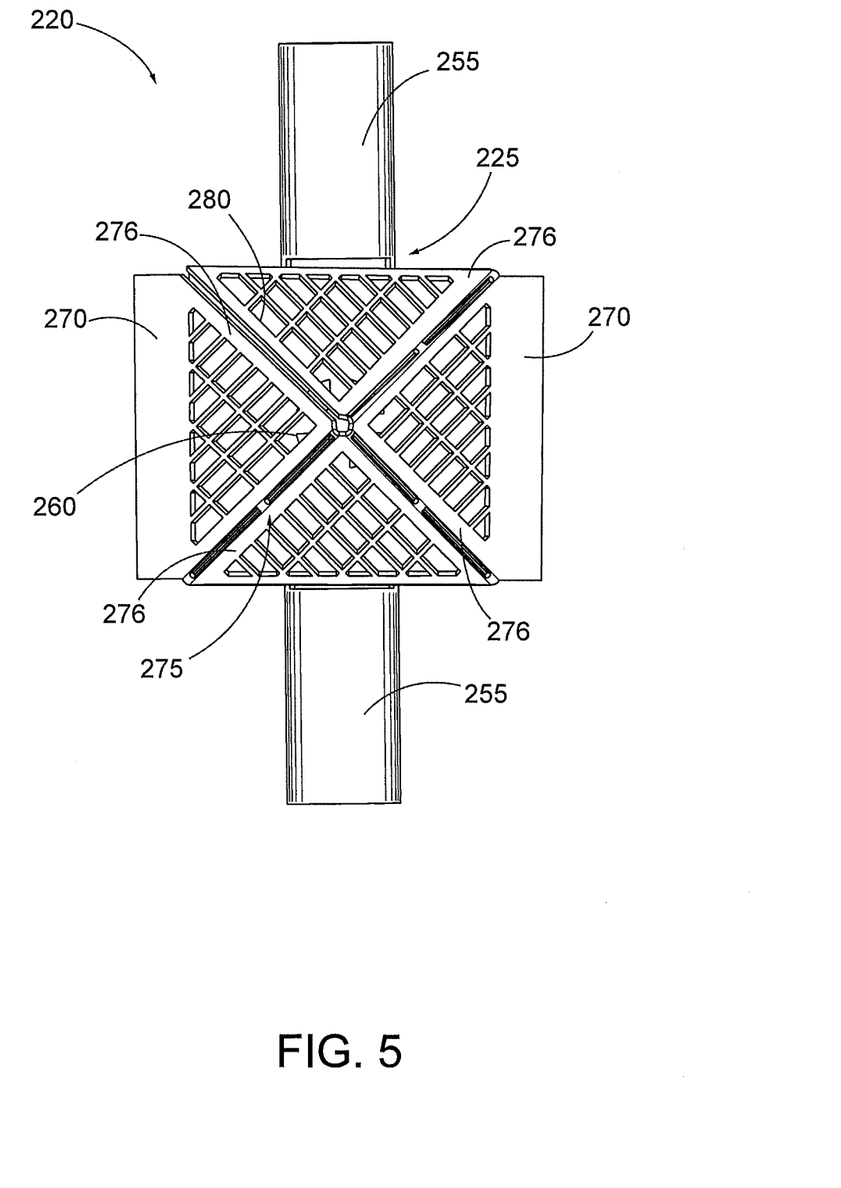
FIG. 5 is a top view thereof.

Gantry 175 is movable along a y axis perpendicular to the x axis to move the nozzle 120 along the y axis and movement of the gantry 175 and carriage 180 may be coordinated to position nozzle 120 within a plane defined by the x and y axes. Motion assembly 170 may further include a nozzle drive 185 (FIG. 4) that moves nozzle vertically along a z axis. In the example shown, nozzle drive 185 is supported on carriage 180 and connected to the cutting head 110 from which nozzle 120 extends. It will be understood that cutting head 110 may be provide with additional degrees of freedom to perform additional local movements of nozzle 120 if desired. Cutting head 110 may be provided with more than one nozzle or additional cutting tools as desired. In the example shown, cutting head 110 includes a drill 115 in addition to nozzle 120. Drill 115 may be used to perform boring operations for a given workpiece W or to facilitate the start of a cut.

With continued reference to FIG. 1, an abrasive recovery system, generally indicated by the number 200 is provided for use with waterjet cutting system 100. Abrasive recovery system 200 may include at least one drain assembly 220 positioned within the tank to withdraw water with abrasive from the tank for recycling. In general each drain assembly 220 includes a drain coupler 225 that is positioned within the tank, and has a drain opening 260 through which water from the tank is withdrawn. The drain coupler 225 is fluidly connected to a conduit 235 that extends from the tank to carry the abrasive laden water from the tank to an external recycling station. A strainer 236 may be provided within conduit 235 to catch large particles and debris that may have been drawn from tank before they reach a pump 237. Pump 237 is used to provide suction to abrasive recovery assembly 200 drawing fluid from tank as described more completely below.

In the past, such drains have been connected to each other and/or the external conduit by rigid metal pipes making it difficult to position and install drains within the tank. The rigid connections also reduced the ability to reposition drains relative to a particular workpiece. Finally, the rigid connections often made it difficult to service, clean or repair the drains without having to, remove the drains and their rigid connections as a whole.

To that end, the abrasive recovery system 200 shown in the figures includes a flexible hose 250 within the tank connecting drain couplers 225 to each other and to the external conduit 235. It was previously established that flexible hoses were not suitable in the operating environment of a water jet cutting system. The water jet tank provides an extremely harsh environment due to the high pressure cutting stream entering the tank and the concentration of abrasive material drawn through the pipes during the abrasive recovery process. Rigid metal pipes have been used to stand up to the cutting stream and transport of abrasive. It has been accepted that flexible tubing would not be capable of withstanding these harsh conditions. Indeed, repeated testing leading to the present disclosure showed that flexible tubing was either easily cut by the water jet cutting stream entering the tank or rapidly degraded from the inside out from the transport of abrasive to make flexible tubing unsuitable in terms of cost and the downtime required to constantly replace the tubing. It will be appreciated that to replace the hose, water jet cutting must be stopped and the tank drained resulting in significant down time.

Figure 9:
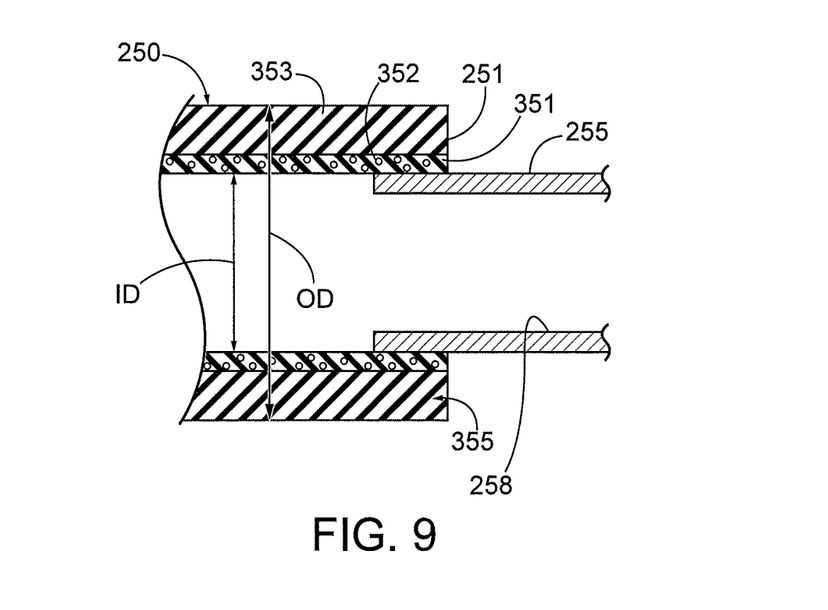
FIG. 9 is a fragmented view similar to FIG. 8 showing another example of a coupler for connecting a flexible hose to the drain coupler.

Testing of a flexible hose used in sand blasting applications led to the unexpected result that the flexible hose was capable of withstanding the water jet cutting stream without penetration of the hose wall. Moreover, the flexible hose did not rapidly degrade from transport of the abrasive laden water and other conditions within tank. With reference to FIG. 9, the flexible hose 250 is manufactured from an abrasive resistant natural rubber liner 351 with a braided textile cord 352 to reinforce the liner 351 and a weather, ozone and abrasive resistant cover 353. The flexible hose has a relatively thick wall 355 with an outer diameter (OD) to inner diameter ratio (ID) in the range of about 1.5 to 2. In one example, the outer diameter to inner diameter ratio was about 1.6. Despite the relatively thick wall thickness, the hose is sufficiently flexible to facilitate installation within the confines of the cutting tank and repositioning of the drain couplers even after the hose sections coupling them together or to the wall of the tank are in place. According to one example, an Endurolite product from Panblast was found suitable for long term use in a water jet cutting system. This product included a 2 ply braided textile cord reinforcing the rubber liner. Products offered by Panblast having 3 and 4 ply reinforced liners were also suitable. It is believed that sand blasting hoses or hoses having similar characteristics for resisting abrasive and wall thickness would also be suitable.

To accommodate the flexible hose, abrasive recovery system 200 includes at least one drain coupler 225 adapted for use with a flexible hose 250 as described more completely below. Drain coupler 225 includes a drain nozzle 245 having at least one coupling portion 255 to which hose 250 is attached. In the example shown in the figures, drain coupler 255 includes a pair of coupling portions 255 aligned along a common axis A and extending in opposite directions i.e. 180 degrees relative to each other. It will be understood that such coupling portions 255 may extend at angles less than 180 degrees to facilitate different orientations of the abrasive recovery assembly. With reference to FIG. 1, a drain coupling 225 may be used to form the end of abrasive recovery assembly 200 and include only a single coupling portion 255 that receives a flexible hose 250. Alternatively, as shown, a first coupling portion $255_A$ may receive flexible hose 250 and a second coupling portion $255_B$ may be closed by an end cap 240 attached to this coupling portion. Alternatively, hose 250 may be terminated by attaching it to the wall of the tank. To that end, tank may be provided with a fitting 252 to which the hose is attached. This fitting may simply be a nozzle or flange sized to receive the hose there on attached to an interior of the tank. As a further alternative, fitting 252 may penetrate the wall of tank 140 and include a valve 253 that is normally closed. Valve 253 could be used to purge abrasive recovery system 200 by selectively opening valve. For example, a check valve, such as a ball valve, may be suitable for this purpose.

Figure 2:
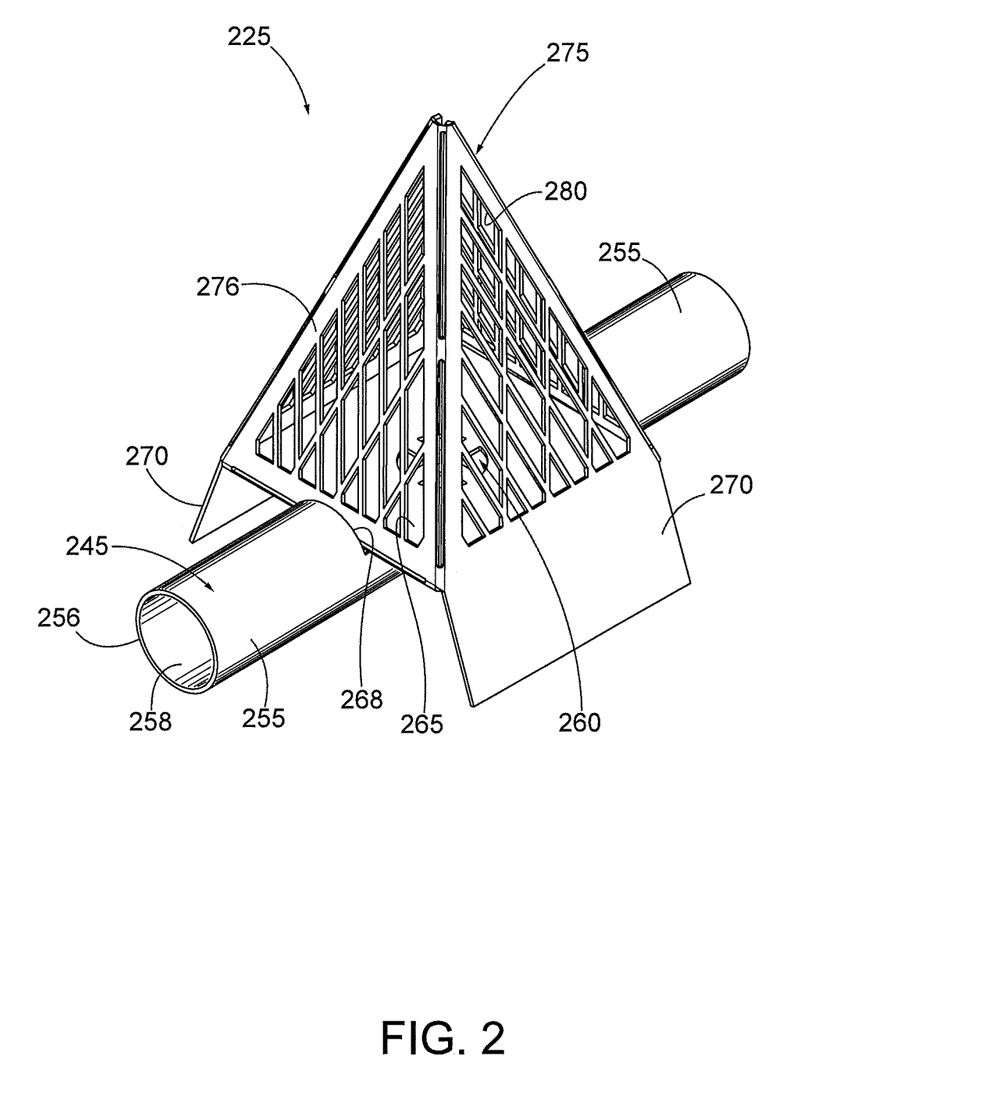
FIG. 2 is a perspective view of a drain assembly in an abrasive recovery system according to an example.
Figure 6:
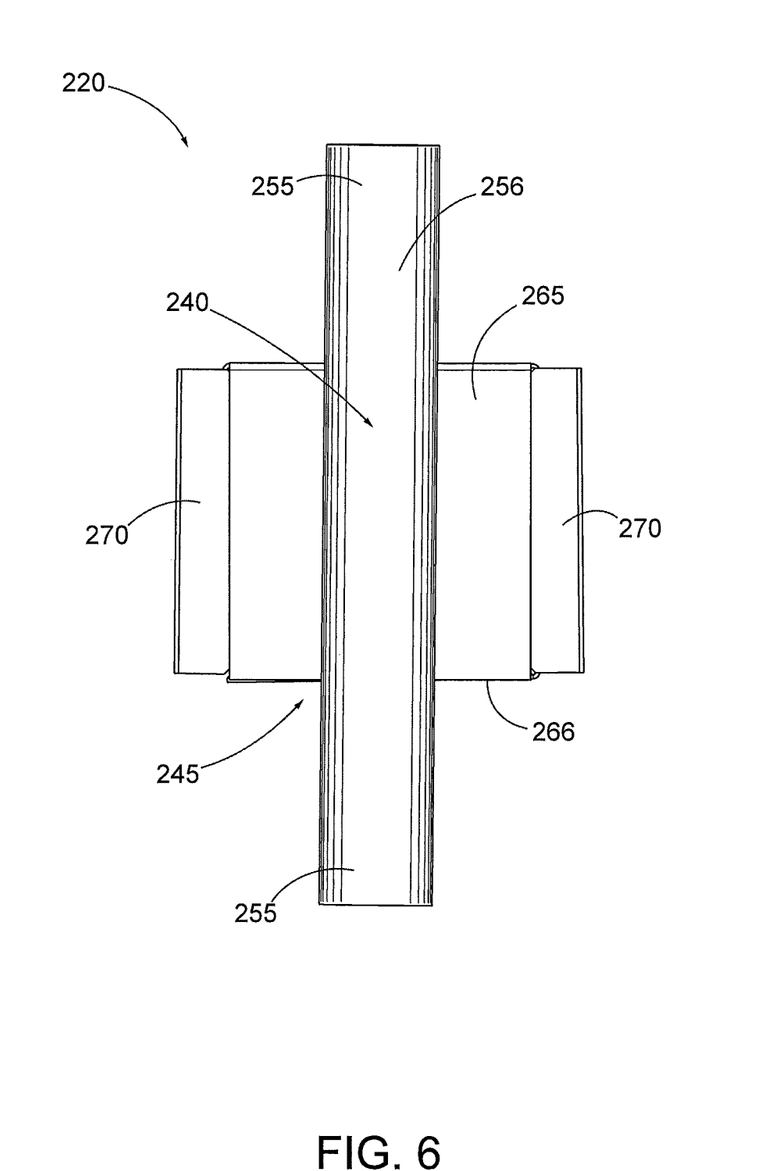
FIG. 6 is a bottom view thereof.

With reference to FIG. 2 and FIG. 6, drain coupling 245 may be formed from a tubular member that includes at least one wall 256 that defines a drain bore 258. In the depicted example, wall 256 has a circular cross-section, however, other regular or irregular polygon cross-sections or other cross-sections defining a bore may be used.

Figure 7:
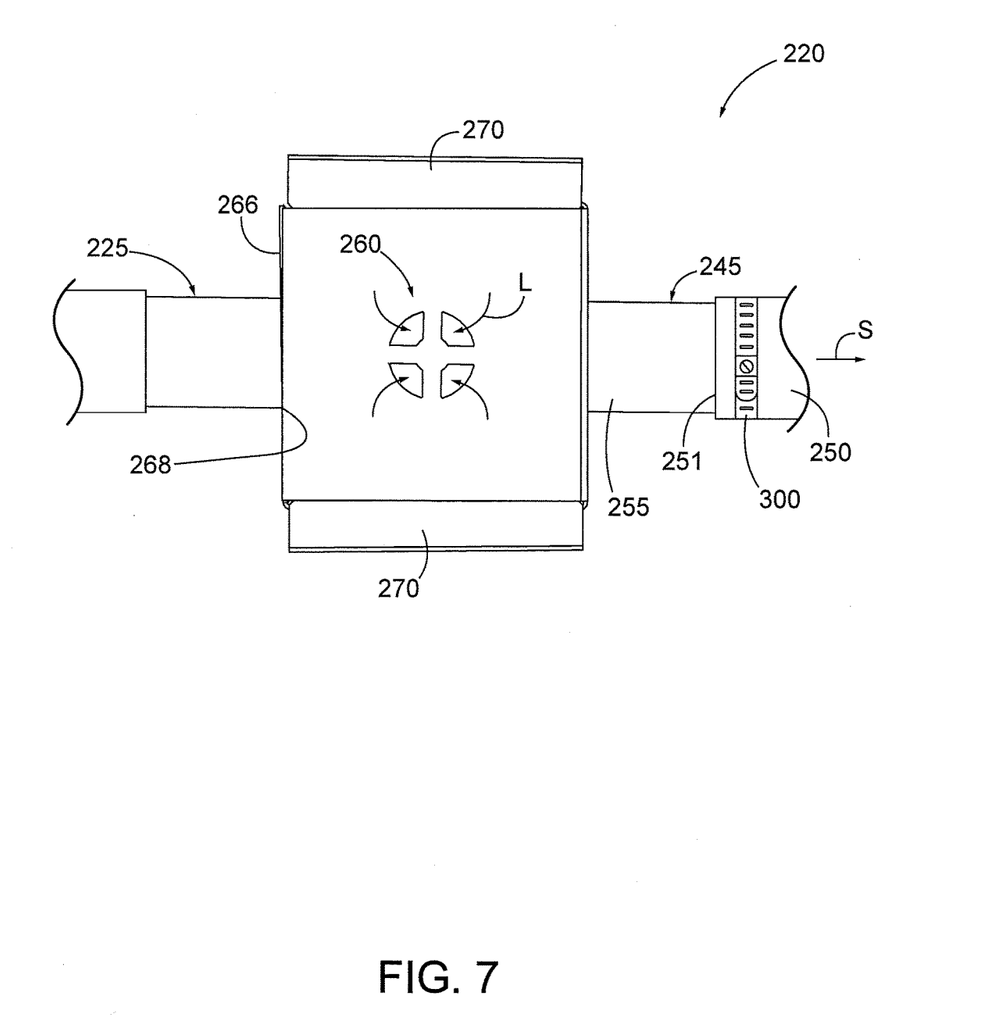
FIG. 7 is a top view thereof with a pre-filter removed to show details of a drain opening according to an example.

Drain coupler 225 defines at least one drain opening 260 (best seen in FIG. 7) that communicates with the drain bore 258. It will be understood that drain opening 260 may be formed in wall 256 of drain nozzle 245 effectively forming a one piece drain coupler 225. Drain opening 260 is sized to permit sufficient flow of abrasive laden fluid through system 200. As discussed above, a pump 237 is provided to apply a suction S (FIG. 7) to system 200 to draw abrasive laden liquid L from tank 140 for purposes of recovery. Drain opening 260 may be selected with the pump rate in mind to maintain a selected flow velocity suitable for recovery of abrasive. It is understood that drain opening 260 may be large relative to the size of abrasive particles and debris from the cutting process including metal filings or other material cut from workpiece W may pass through drain opening 260. To that end, a strainer 236 may be provided upstream of pipe and downstream of drain opening to collect larger particles before they enter pump 237. In the example shown, strainer 236 is placed outside of tank 140 within conduit 235 to facilitate emptying of strainer 236.

As described more completely below, a pre-filter 275 may be provided to screen particles large enough to completely block or plug drain opening 260 may be provided. In the example, drain coupler 225 includes a base 265 that defines drain opening 260 and provides support for pre-filter 275. The base 265 may be a plate-like member that extends substantially horizontally and includes a perimeter 266. The base 265 may have any shape defined by it perimeter 266 including but not limited to regular or irregular polygon shape, a circular shape or an oval shape. In the example shown, base 265 is generally a square shape.

Figure 3:
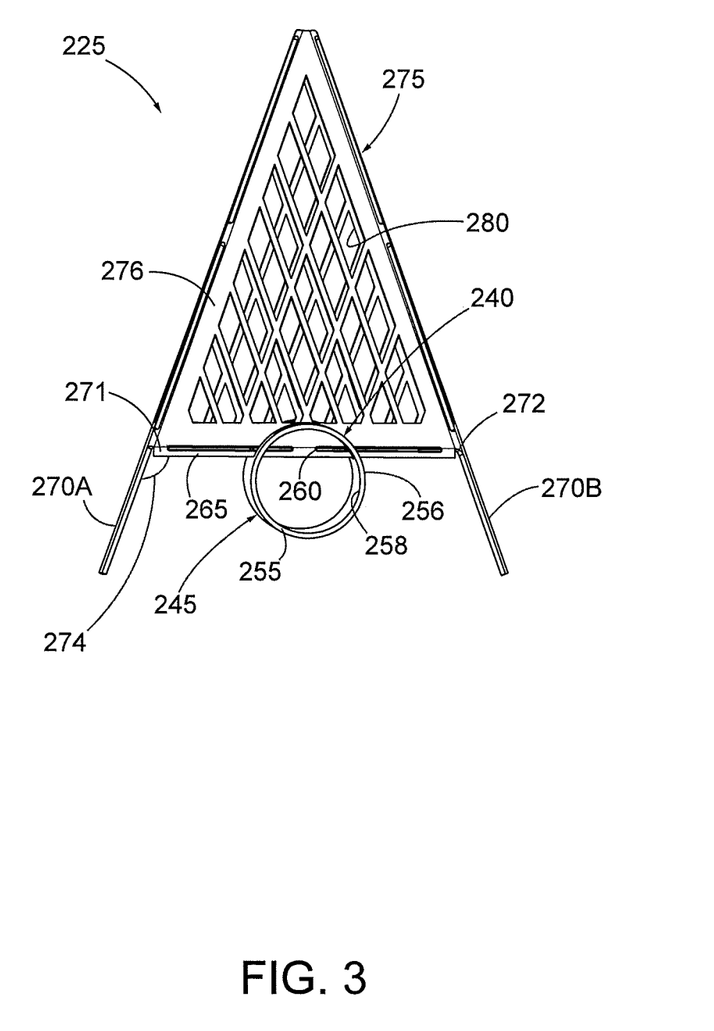
FIG. 3 is an end view thereof.

As shown in FIG. 2, drain nozzle 245 may define a recess 268 in which the base 265 is received. Base 265 may further include at least one foot 270 that extends downward from the base 265 to contact a supporting surface such as the floor of tank 140. In the example shown, a first foot 270 and a second foot $270_A$ and a second foot $270_B$ (FIG. 3) extend downward from opposite sides 271, 272 of base 265. Each foot 270 may extend parallel to the axis A defined by drain coupler 225. It will be understood that in other examples, feet may extend perpendicular to or at other angles relative to axis A and be located on additional sides of base 265 or attached directly to drain nozzle 245.

Feet 270 extend downward of the drain nozzle 245 a distance D to raise drain nozzle 245 above the floor of tank 140. This provides a clearance to facilitate attachment of the flexible hose 250 to coupling portion 255 and repositioning of hose 250 and coupler 225 within tank 140. Feet 270 may be spaced laterally outward of drain nozzle 245. In the example shown, feet 270 extend downward from the perimeter 266 of base 265. To provide further stability, feet 270 may extend downward and outward from the perimeter 266 of base 265 forming an obtuse angle 274 with base 265 as shown. It will be understood that any angle 274 may be used depending on the application or ornamental considerations. In the example, angle 274 is selected to match the aesthetic of pre-filter 275 shown in the example.

Pre-filter 275 includes at least one wall 276 that extends upwardly from base 265 to cover drain opening 260 and prevent large particles or debris from entering or covering drain opening 260. The pre-filter 275 generally defines one or more openings 280 that are sized to screen particles or debris from reaching drain opening. In general, pre-filter is a permeable shroud that covers drain opening 260 as shown. The particular shape of pre-filter 275 and its openings 280 may vary to a great extent within these parameters and is limited only by the imagination of the designer and desired ornamental aesthetic for the drain coupler 225. Pre-filter 275 may extend upward and inward from perimeter of base 265 forming an arch, a dome, a cone, or other surface that debris is unlikely to catch or rest on to help prevent debris from accumulating on pre-filter 275. In the example shown, pre-filter has a four sided pyramid shape.

Figure 8:
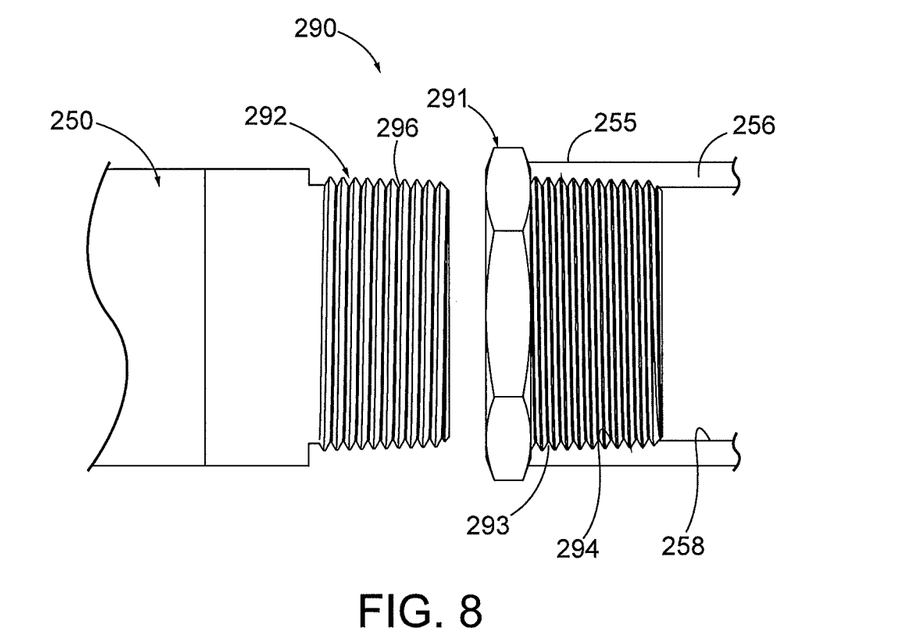
FIG. 8 is a fragmented view depicting one example of a coupler for connecting a flexible hose to the drain coupler.

With reference to FIGS. 8 and 9, flexible hose 250 may be attached to coupling portion 255 of drain nozzle 245 in a variety of manners. For example, as shown in FIG. 8, a fitting, generally indicated by the number 290 may be used to couple hose 250 to portion 255. In the example, fitting 290 includes a threaded coupler having a first portion 291 that is a female end and a second portion 292 that is a male end. First portion 291 is shown connected to nozzle 245 and second portion 292 connected to hose 250, however, it will be understood that these positions may be reversed. In the example, first portion 291 includes an external threaded portion 293 that mates with an internal thread 294 within wall 256 of coupling portion 255. First portion 291 also includes an internal thread that mates with the external thread 296 on second portion 292. It will be understood that such a connection may be particularly useful in retro-fitting existing couplers that relied on a threaded connection to attach metal pipes thereto.

In FIG. 9, coupling portion 255 includes a wall 256 that is cylindrical in shape to facilitate sliding an end 251 of hose 250 over coupling portion 255. Once hose 250 is slid over at least a portion of coupling portion 255 it may be secured with a suitable coupler 300 such as a hose clamp or the like (FIG. 1).

It will be understood that the various optional features and components described herein may be interchanged and combined, as illustrated in the examples below.

EXAMPLES

Example 1

An abrasive recovery system for a waterjet cutter, the abrasive recovery system comprising: a drain coupler including at least one drain nozzle, the drain nozzle having at least one wall defining a drain nozzle bore, the drain coupler defining a drain opening wherein the drain opening is in fluid communication with the drain nozzle bore; and a flexible hose coupled to the drain nozzle to establish fluid communication between the drain opening and the flexible hose.

Example 2

The abrasive recovery system of example 1 further comprising a pre filter supported on the drain coupler upstream of the drain opening, wherein the pre filter includes plural openings having a size to prevent entry of particles greater than the size from entering the drain opening.

Example 3

The abrasive recovery system of example 1, wherein the drain coupler includes a coupler support extending downward relative to a base of the drain nozzle.

Example 4

The abrasive recovery system of example 3, wherein the coupler support includes a pair of feet extending parallel to the drain nozzle and spaced outward from the drain nozzle.

Example 5

The abrasive recovery system of example 1, wherein the drain coupler includes a base plate, the base plate defining the drain opening, and wherein the at least one drain nozzle includes a coupling portion extending outward of a perimeter of the base plate.

Example 6

The abrasive recovery system of example 5, wherein the coupling portion is a tubular member, and wherein the flexible hose is slidably received on the coupling portion and secured thereto with a coupler.

Example 7

The abrasive recovery system of example 6, wherein the coupler is a hose clamp.

Example 8

The abrasive recovery system of example 5, wherein the coupling portion includes a threaded receiver adapted to threadably attach to the flexible hose.

Example 9

The abrasive recovery system of example 1, wherein the flexible hose includes a wall having an inner diameter and an outer diameter, wherein the ratio of the outer diameter to the inner diameter is in the range of about 1.5 to about 2.0.

Example 10

The abrasive recovery system of example 9, wherein the ratio is about 1.6.

Example 11

The abrasive recovery system of example 9, wherein the wall includes an abrasive resistant natural rubber liner reinforced with a plural ply braided textile cord and a weather, ozone and abrasive resistant cover.

Example 12

The abrasive recovery system of example 1, wherein the drain coupler includes a base, the base defining the drain opening, the at, least one drain nozzle being attached to the base below the drain opening; and a pre-filter extending upward from the base to cover the drain opening, wherein the pre-filter includes plural openings sized to screen debris before it enters the drain opening.

Example 13

The abrasive recovery system of example 10, wherein the drain opening includes plural drain holes, the drain holes being sized smaller than the openings in the pre-filter to perform further screening.

Example 14

The abrasive recovery system of example 10, wherein the drain coupler includes a pair of feet spaced outward relative to the at least one drain nozzle, the pair of feet being located on opposite sides of the base and extending downward below the drain nozzle to define a clearance for attaching the flexible hose to the nozzle.

Example 15

The abrasive recovery system of example 1, wherein the drain coupler includes a base defining the drain opening and wherein the at least one drain nozzle includes a drain portion and a coupling portion formed from a tubular member, wherein the drain portion is notched to receive the base and the coupling portion extends outwardly from the base.

Example 16

The abrasive recovery system of example 1 further comprising a water jet cutting nozzle and a tank, the drain assembly and the flexible hose being supported on a floor of the tank below the water jet cutting nozzle.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

What is claimed is:

1. An abrasive recovery system for a waterjet cutter, the abrasive recovery system comprising: a drain assembly including a drain coupler including at least one drain nozzle, the drain nozzle having at least one wall defining a drain nozzle bore, the drain coupler defining a drain opening wherein the drain opening is in fluid communication with the drain nozzle bore;
    a flexible hose coupled to the drain nozzle to establish fluid communication between the drain opening and the flexible hose; and
    a water jet cutting nozzle configured to perform a cutting operation; and
    a tank, the drain assembly and the flexible hose being supported within the tank below the water jet cutting nozzle.

2. The abrasive recovery system of claim 1 further comprising a pre filter supported on the drain coupler upstream of the drain opening, wherein the pre filter includes plural openings having a size to prevent entry of particles greater than the size from entering the drain opening.

3. The abrasive recovery system of claim 1, wherein the drain coupler includes a coupler support extending downward relative to a base of the drain nozzle.

4. The abrasive recovery system of claim 3, wherein the coupler support includes a pair of feet extending parallel to the drain nozzle and spaced outward from the drain nozzle.

5. The abrasive recovery system of claim 1, wherein the drain coupler includes a base plate, the base plate defining the drain opening, and wherein the at least one drain nozzle includes a coupling portion extending outward of a perimeter of the base plate.

6. The abrasive recovery system of claim 5, wherein the coupling portion is a tubular member, and wherein the flexible hose is slidably received on the coupling portion and secured thereto with a coupler.

7. The abrasive recovery system of claim 6, wherein the coupler is a hose clamp.

8. The abrasive recovery system of claim 5, wherein the coupling portion includes a threaded receiver adapted to threadably attach to the flexible hose.

9. The abrasive recovery system of claim 1, wherein the flexible hose includes a wall having an inner diameter and an outer diameter, wherein the ratio of the outer diameter to the inner diameter is in the range of about 1.5 to about 2.0.

10. The abrasive recovery system of claim 9, wherein the ratio is about 1.6.

11. The abrasive recovery system of claim 9, wherein the wall includes an abrasive resistant natural rubber liner reinforced with a plural ply braided textile cord and a weather, ozone and abrasive resistant cover.

12. The abrasive recovery system of claim 1, wherein the drain coupler includes a base, the base defining the drain opening, the at least one drain nozzle being attached to the base below the drain opening; and a pre-filter extending upward from the base to cover the drain opening, wherein the pre-filter includes plural openings sized to screen debris before it enters the drain opening.

13. The abrasive recovery system of claim 12, wherein the drain opening includes plural drain holes, the drain holes being sized smaller than the openings in the pre-filter to perform further screening.

14. The abrasive recovery system of claim 10, wherein the drain coupler includes a pair of feet spaced outward relative to the at least one drain nozzle, the pair of feet being located on opposite sides of the base and extending downward below the drain nozzle to define a clearance for attaching the flexible hose to the nozzle.

15. The abrasive recovery system of claim 1, wherein the drain coupler includes a base defining the drain opening and wherein the at least one drain nozzle includes a drain portion and a coupling portion formed from a tubular member, wherein the drain portion is notched to receive the base and the coupling portion extends outwardly from the base.

16. The abrasive recovery system of claim 1, wherein the water jet cutting nozzle is configured to direct a cutting stream in a path relative to the tank to perform the cutting operation, wherein the flexible hose is at least partially within the path of the cutting stream.

17. The abrasive recovery system of claim 1, wherein the tank holds a liquid, the drain assembly being submerged within the liquid during the cutting operation.

18. The abrasive recovery system of claim 1 wherein the drain nozzle is movable within the tank.

* * * * *